Jan. 14, 1958  S. A. MINERA  2,819,745
FRUIT STEMMING MACHINE
Filed July 26, 1954  3 Sheets-Sheet 1
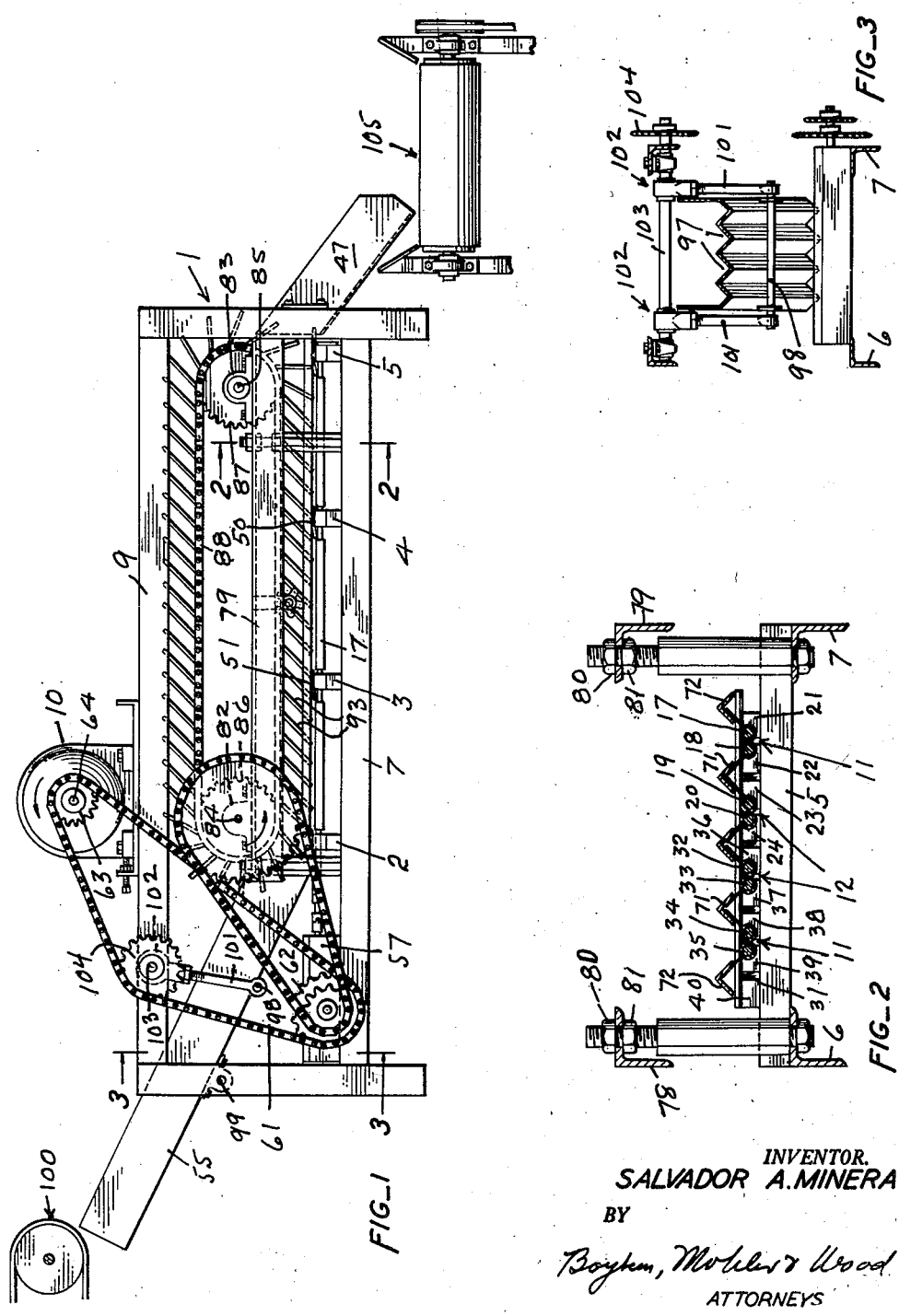
INVENTOR.
SALVADOR A. MINERA
BY
Boyken, Mohler & Wood
ATTORNEYS Jan. 14, 1958  S. A. MINERA  2,819,745
FRUIT STEMMING MACHINE
Filed July 26, 1954  3 Sheets-Sheet 2
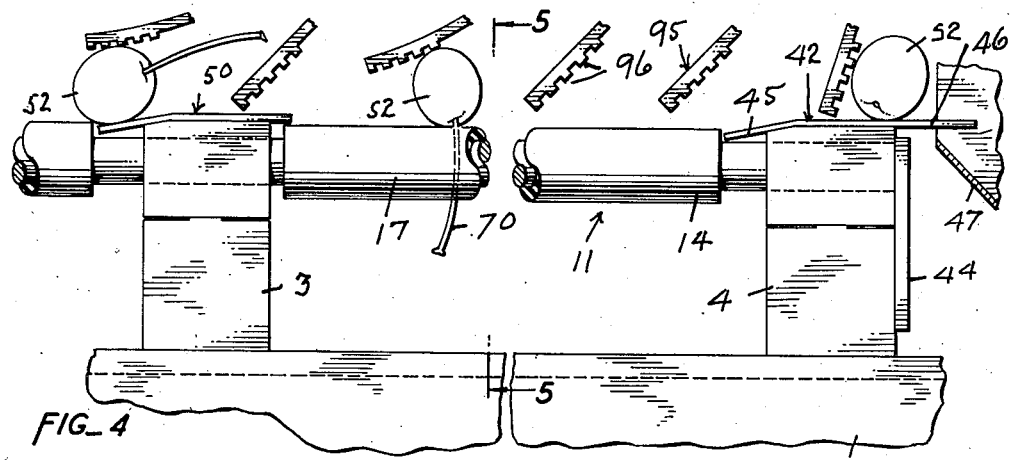
FIG_4
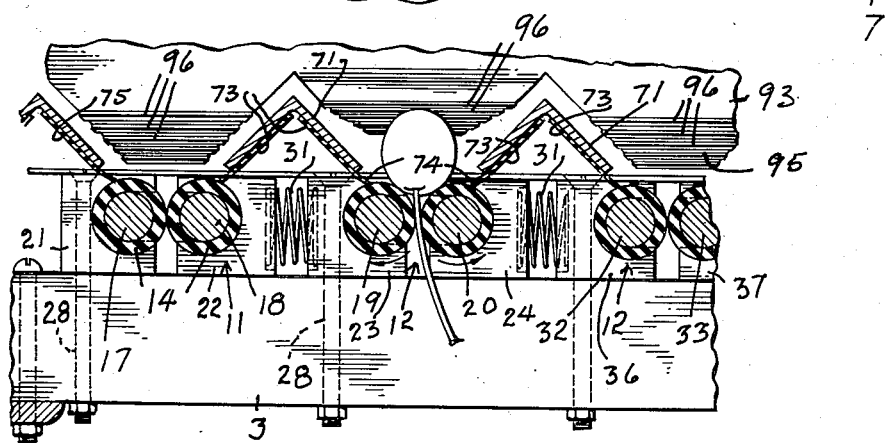
FIG_5
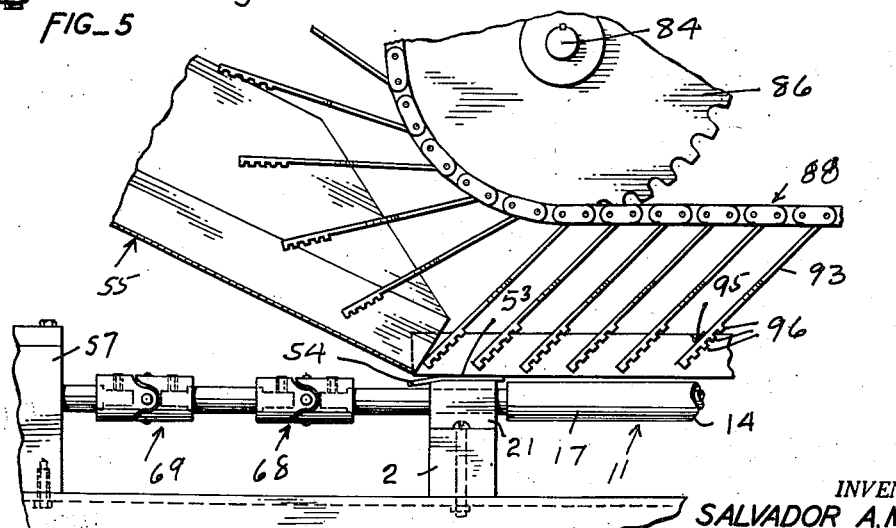
FIG_6
INVENTOR.
SALVADOR A. MINERA
BY
Boykin, Mohler & Wood
ATTORNEYS Jan. 14, 1958  S. A. MINERA  2,819,745
FRUIT STEMMING MACHINE
Filed July 26, 1954  3 Sheets-Sheet 3
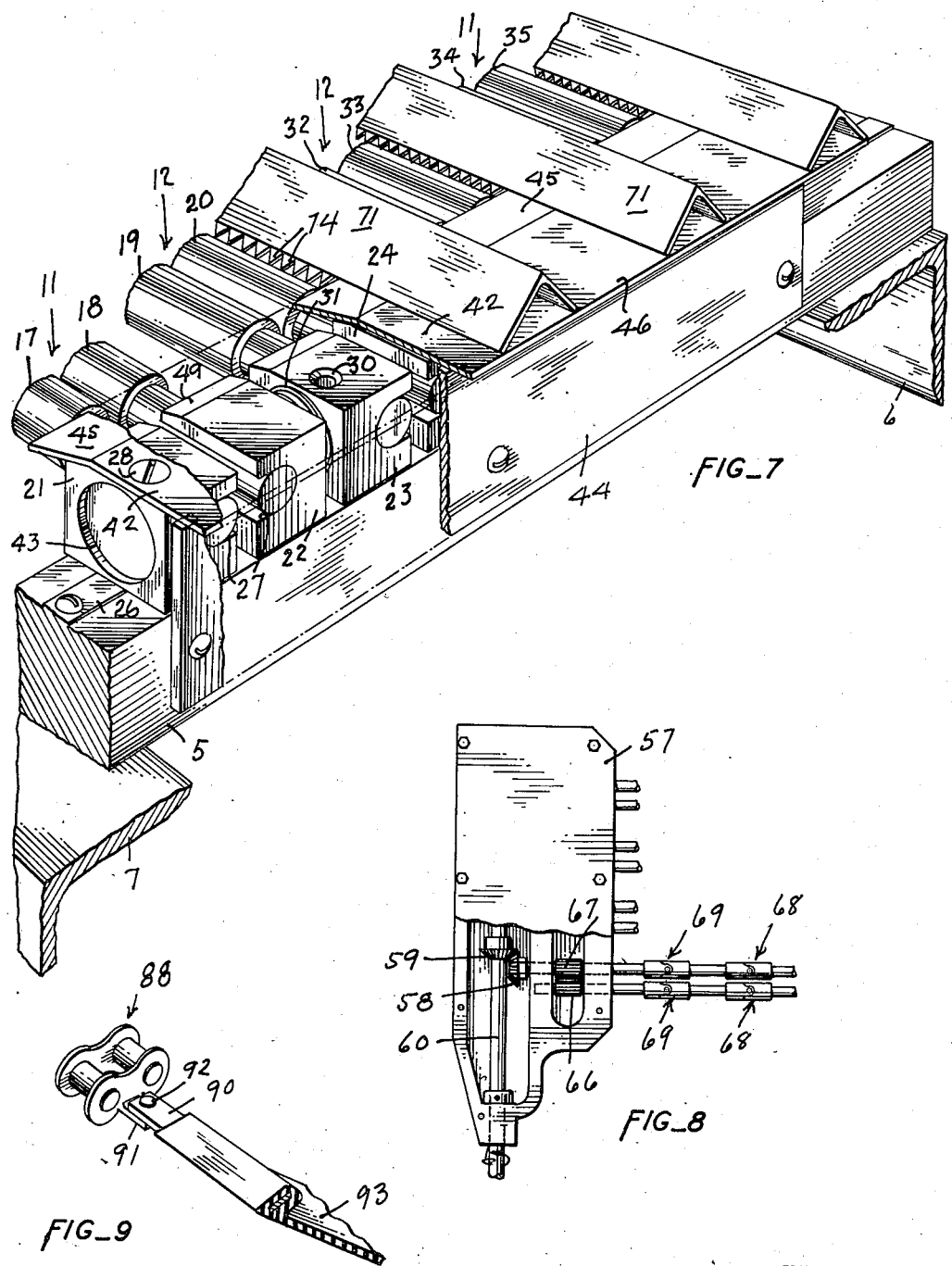
FIG_7
FIG_8
FIG_9
INVENTOR.
SALVADOR A. MINERA
BY
Boykin, Mohler & Wood
ATTORNEYS

United States Patent Office

2,819,745
Patented Jan. 14, 1958

2,819,745

FRUIT STEMMING MACHINE

Salvador A. Minera, San Francisco, Calif.

Application July 26, 1954, Serial No. 445,541

7 Claims. (Cl. 146—55)

This invention relates to a machine for stemming fruit, such as certain grapes, olives, etc., in which the fruit has a major and a minor axis with the stem substantially along the minor axis, and is an improvement over the machine disclosed in United States Letters Patent No. 2,342,358, of February 22, 1944.

One of the objects of the present invention is the provision of a stemmer in which the efficiency is not impaired by the presence of water, and in which a substantially greater volume of grapes and the like may be stemmed, without injury to the fruit and with greater efficiency than heretofore, and which stemmer is economical to make, operate and to keep in proper condition.

One of the difficulties encountered with stemmers that operate on the principal of rolling the grapes along pairs of rollers so that the stems will be caught between the rollers and pulled from the grapes, or olives, etc., is the fact that the rollers and bearings may become so worn during a season as to necessitate some replacements or reconditioning. Should this necessity arise at the height of the season when the machines should be operating twenty-four hour shifts, confusion and loss results.

With the present invention the rollers are self adjusting and will maintain their top efficiency during an entire season and longer.

The use of water is usually desirable, or unavoidable at one or more times in handling grapes and other similar fruit to be stemmed. Also water is used to clean the machines, and this cleaning is many times done during intervals that may occur virtually while the machines are being used in the stemming operation. The present machine is adapted to operate just as efficiently when subjected to moisture as when dry since there are no moisture absorbent parts or traps to collect and to hold moisture. Also the machine can be more quickly and efficiently sterilized by steam at any time, than heretofore, to clean the same and to prevent fermentation of juice and solids and to prevent infection by microorganisms, insects and spores.

Other objects and advantages will appear in the description and in the drawings.

In the drawings, Fig. 1 is a side elevational view of the stemming machine.

Fig. 2 is an enlarged sectional view at line 2—2 of Fig. 1.

Fig. 3 is a sectional view at line 3—3 of Fig. 1.

Fig. 4 is a fragmentary part sectional, part elevational view of structure generally illustrating the manner in which the fruit is engaged and rolled along the rollers.

Fig. 5 is a fragmentary sectional view of a portion of the machine at line 5—5 of Fig. 4.

Fig. 6 is a part sectional and part elevational view of a part of the machine at the feed end.

Fig. 7 is a fragmentary perspective view, partly in section and partly broken away showing several of the bearings for the rollers and their support and part of the fruit guiding means, certain parts being broken away and in section to show the bearings.

Fig. 8 is a top plan view of the gear box at the head end of the machine, the cover being broken away to show interior structure.

Fig. 9 is a perspective view, partly in section, showing the manner in which the fruit engaging members are held on the endless chains, and the structure of such members.

In detail, the machine illustrated in the drawings comprises a frame, generally designated 1, having suitable cross members 2, 3, 4, 5 spaced successively from the head of the machine and supported on side frame members 6, 7 (Figs. 1, 2). Other side frame members 8 parallel with and spaced above frame members 6, 7 respectively, support a motor 10 that is connected, as hereinafter described, with various operating parts of the machine for actuating them.

The cross members 2 to 5 support bearings that, in turn, rotatably support a plurality of spaced pairs of horizontally extending rollers for rotation. In the drawings (Fig. 2) only four pairs of said rollers are shown, but it is to be understood that this number is purely for illustrative purposes, since any desired number of said pairs can be provided.

Generally, the end pairs of rollers (Fig. 2) are designated 11, and the pairs of rollers intermediate said end pairs are generally designated 12. The rollers of said pairs are preferably disposed on a common generally horizontally disposed plane. In the drawings, the rollers are horizontal and are in a horizontal plane, and this is the preferred structure, but the machine would operate satisfactorily if the rollers were tilted to a certain degree, hence the term "generally horizontal" is intended to include any degree of inclination of the rollers or the plane in which they are disposed at which the machine will satisfactorily operate. In any event such inclination would be substantially closer to horizontal than to vertical.

The rollers themselves preferably comprise continuous cylindrical metal rollers that have a covering 14 (Fig. 4) of rubber or lastic plastic such as polymerized chloroprene (neoprene), or other suitable synthetic materials having rubber-like properties. The word "rubber," herein used, is intended to cover any such suitable materials as well as rubber.

The cover 14 on said rollers is left off at the points where the rollers are supported in the bearings, and as the bearings for each roller are the same, whether at their ends or intermediate their ends, the following description of a pair of bearings for one end of the rollers of a pair will apply to the other bearings and also the description of an adjacent pair of bearings at one of the ends of an adjacent pair of rollers will apply to the other corresponding bearings.

Fig. 7 clearly shows bearing structure at the ends of the rollers that are at the foot end of the machine.

The pair 11 of rollers, which is one end pair, comprises individual rollers 17, 18, the roller 17 being the outermost roller of the plurality of pairs shown, and the pair 12 of rollers adjacent to pair 11 are designated 19, 20. Rollers 18, 19 are the adjacent rollers of the spaced pair 11, 12, that are at one side of the machine.

Bearings 21, 22 respectively support the ends of rollers 17, 18 and bearings 23, 24 respectively support the ends of rollers 19, 20.

These bearings 21 to 24 and the remaining bearings that are in the row supporting the rollers of pairs 11, 12, are supported on the central flat, raised ridge 26 that extends longitudinally of cross member 5 (Fig. 7) (each cross member is the same in this respect).

The bearings 21, 22 have laterally, opposedly opening channel-like recesses 27 in their opposed sides for receiving and rotatably supporting the ends of rollers 17, 18 therein, which ends can be laterally inserted into said recesses, and when the adjacent sides of rollers 17, 18 are in engagement the bearings 21, 22 will be spaced apart slightly. Bearing 21 is rigidly held against ridge 26 by a bolt 28 that extends through said bearing beyond the base of recess 27 and into cross member 5. Bearing 22 is not secured to the ridge 26, but is slidably supported thereon for movement toward and away from bearing 21 as the rollers 17, 18 wear or when stems or other solids passing between said rollers force roller 18 away from roller 21.

For the adjacent pair 12 of rollers 19, 20 the bearings 23, 24 also have laterally oppositely opening recesses 27 for the ends of shafts 19, 20 the same as is provided for bearings 21, 22.

The bearing 23 is secured against ridge 26 of cross member 5 by a bolt extending through opening 30 in the same manner as bolt 28 extends through a corresponding opening in bearing 21, and bearing 24 is movably supported on ridge 26 of cross member 5 the same as bearing 22.

An expansion coil spring 31 is positioned between the adjacent spaced bearings 22, 23 to yieldably urge the bearing 22 toward bearing 21 and for holding roller 18 in yieldable engagement with roller 17.

The other pair 12 of intermediate rollers comprise rollers 32, 33 and the other outer pair 11 of rollers comprise rollers 34, 35. Bearings 36, 37 are for rollers 32, 33 and bearings 38, 39 are for rollers 34, 35 (Fig. 2). Bearings 37, 39 are movable, and bearings 36, 38 are fixed, and inasmuch as bearing 39 is an end roller, a stop or fixed member 40 (Fig. 2) is secured on the cross frame members outwardly of the bearing 39 and a spring 31 is disposed between the stop member and bearing 39.

By the above arrangement it is seen that alternate bearings are movable, and those therebetween are fixed. This is the preferred arrangement since the distance between the alternate fixed bearings will always be the same. Other arrangements could be made so that both the end rollers of the row would be fixed, but then one spring would have to react between a pair of movable rollers.

A strip 42 extends across the upper sides of the bearings and the screws that secure the stationary bearings to the cross member 5 may extend through strip 42 also.

The upper surfaces of the movable bearings are slightly spaced below the strip 42, hence they can have a rocking movement generally about an axis perpendicular to the lengths of the rollers.

The adjacent sides of the adjacent bearings that support the adjacent pairs of rollers are preferably recessed as at 43 for holding each end of each spring 31 therein. One end bearing 21 shows such recess, although this recess in this particular bearing serves no purpose. It is different with the other end bearing 39.

An end plate 44 screwed to a side of the cross member 5 extends across the ends of the rollers and functions to permit endwise movement of the rollers thus functioning as a thrust bearing for the rollers at one of their ends.

The bearings at the head end of the frame on cross member 2 are the same as described for those at the foot of the frame, it being understood that the movable bearings are on the same rollers, and the fixed bearings are on the same rollers.

The bearings on the intermediate cross members and on the member 2 are the same as described for the ends of the rollers at the foot end of the machine. It is, of course, obvious that where intermediate bearings are used, the bearings on each shaft must be the same, i. e., they must all be movable or fixed.

Plates similar to plate 44 are not required for the intermediate bearings, nor for the bearings at the head ends of the rollers, as will later be apparent.

The top plate 42 that extends across the bearings at the foot or discharge end of the machine has a lip 45 (Fig. 4) that is slanted downwardly to extend into the space between the bearings and the cover 14 of each roller, and also, this plate 42 has an extension 46 at the rear or discharge end that projects over a discharge chute 47. The corresponding corners of the bearings are chamfered at 49 (Fig. 7) for slanting the marginal portion 45 of strip 42.

Strips 50, 51 of substantially the same structure as strip 42 extend across the bearings that are on cross frame members 3, 4. These strips 50, 51 form bridges for carrying the grapes 52 (Fig. 4) or fruit bodies, across the bearings on said frame members 3, 4 and onto the coverings 14 of the portions of the rollers that are adjacent to each set of bearings on the sides thereof that are adjacent to the foot end of the machine.

A strip 53 extends across the head bearings at the head end of the machine (Fig. 6) and the slanted lip 54 of this strip extends below the discharge edge of the feed chute 55.

The head ends of each of the rollers of pairs 11, 12 extend into a gear box 57 (Fig. 8) and the fixed roller of each pair has a bevel or mitre gear 58 secured thereto with its teeth in mesh with a similar gear 59 on a cross shaft 60. This cross shaft 60 is driven by a chain 61 (Fig. 3) that connects between a sprocket wheel 62 on said shaft and a sprocket wheel 63 on a shaft 64 driven by motor 10.

Gears 66, 67, respectively, on the shafts of each pair 11, 12 have their teeth in mesh so that the rollers of each of said pairs will be rotated oppositely, and this direction of rotation is so that the engaging sides of the rollers of each pair will move downwardly.

A pair of universal joints 68, 69 (Fig. 8) are in the sections of each roller between their head ends and the gear box 57.

From the foregoing it is seen that rotation of the shaft 60 will result in the rollers of each pair 11, 12 rotating so that the engaging sides of said rollers will move downwardly. By this structure, a stem 70 on a grape 52 (Fig. 4) that is engaged by the rollers of each pair will be pulled from each grape or whatever fruit is on the rollers.

Extending longitudinally of the pairs of rollers are inverted V-shaped strips or supports 71. Each support 71 is positioned so that its free edge is substantially over the adjacent rollers of each adjacent pair. Thus a support 71 will have its free edges over rollers 18, 19 which are the adjacent rollers of pairs and the apex of the support will be over the space between said rollers. A similar support is over the space between rollers 20, 32 (Figs. 2, 5) and so on, and also similar supports 72 are outwardly of each end roller 17, 35 each support having one of its free edges over one of said end rollers (Fig. 2).

Secured to the undersides of each of the supports 71 is a strip 73 of rubber or the like, and each strip projects from the free lower edge of each support 71 in a notched marginal portion providing rubber teeth 74 (Fig. 7) that extend virtually into contact with the upper sides of said rollers at their outer ends. A similar strip 75 may be carried by each end support 72, but only one is on each such support since only one side of each support 72 extends over a roller.

These strips or supports are preferably right angle strips in cross sectional contour, and their functions include providing the slanted sides of channels in which the bottom of each channel is a pair 11, 12 of rollers. Fruit will be automatically guided onto each pair of rollers by said supports and as the lower edges of these supports are substantially over the center of each roller of each pair, the fruit, such as grapes, will be held on the rollers of each pair. Any grapes that may tend to roll down the rollers with their axes extending transversely of the rollers will have their stems engaged by the teeth 74 of the strips 73 and this will cause such grapes to turn so they will roll end over end and thereby have their stems caught between the rollers. The bridge members 50, 51 have a beneficial effect on preventing the grapes from tending to be slid down the rollers without rolling, and any grape that may tend to slide will be caused to rotate as soon as it comes to one of the plates or strips 50, 51 forming a bridge over which it must pass.

The frame members 6, 7 support sets of upwardly extending posts 77 that adjustably support auxiliary frame members 78, 79 at their upper ends (Fig. 2) and which members 78, 79 extend generally parallel with frame members 6, 7. The upper ends of posts 77 are threaded and extend through said members 78, 79. Nuts 80, 81 on each post above and below each member 78, 79 adjustably support the auxiliary frame members for elevation relative to the rollers therebelow.

Bearings 82, 83 at the head and foot ends respectively, of auxiliary frame members 78, 79 support shafts 84, 85 for rotation, which shafts extend horizontally at right angles to the axes of the rollers therebelow.

A pair of spaced sprocket wheels 86 are secured on shaft 84 and a pair of similar sprocket wheels 87 are secured on shaft 85. The wheels 86, 87, are outwardly of the end rollers of the row of rollers, and a pair of endless sprocket chains 88 connect the wheels 86, 87 that are on corresponding ends of shafts 84, 85. Only the near bearings 82, 83 and near sprocket wheels 86, 87 and near chains 88 are seen in Fig. 1, but the others of each pair are the same.

A plurality of horizontally extending cross bars 90 (Fig. 9) are secured in equally spaced, side by side, horizontally extending parallel relationship at each of their ends to projections 91 on corresponding links in chains 88 by bolts or rivets 92.

Molded onto each cross bar 90 is a rubber strip 93 that depends from each strip in a similarly inclined position relative to the plane in which the rollers are disposed.

The strips are so arranged that their lower edges will be trailing the upper edges in the lower run of bars 90, and it is the upper edges of the strips that are molded onto bars 90. By this structure the strips will be physically held in inclined depending positions on the lower run of bars.

The lower edges of the strips are notched at 94 (Fig. 3) for the inverted V-shaped supports 71 so that generally V-shaped members 95 are formed on the strips, which members extend downwardly between the supports 71, and these members are preferably formed with horizontal paralel ribs 96 on their generally downwardly facing surfaces.

The feed chute 55 (Fig. 3) is preferably formed to provide a plurality of V-shaped channels 97 each leading to the upper ends of the rollers and each positioned to feed fruit onto each of the pairs 11, 12 of rollers.

To insure a substantially continuous flow of grapes and the like in single file onto each pair of rollers, I provide a shaker or vibrating device for the chute 55 in the form of a cross bar 98 (Figs. 1, 3) that extends below the chute at a point between horizontal pivot 99 that supports said chute, and the lower end of said chute. A conveyor 100 may feed grapes onto the upper end of the chute above pivot 99.

The ends of bar 98 are connected by links 101 with eccentrics 102 on a shaft 103, the latter having a sprocket wheel 104 thereon that is actuated by its connection with chain 61. Thus the chute 55 will be giving a rocking upwardly vibratory motion when the machine is in operation.

The discharge chute 57 may discharge stemmed grapes onto a conveyor 105.

The operation will be described with respect to grapes, such as the elongated seedless grapes that have a stem at one of their ends. It is to be understood that the machine is adapted for stemming olives and any fruit that has a major and a minor axis with the stem on the major axis or at one of the ends of the fruit.

The grapes to be stemmed are fed onto the feed chute 55 and from chute 55 in single file onto the head ends of the pairs 11, 12 of rollers. Once the fruit is on these rollers they will be automatically oriented so that their longitudinal axes will be in a vertical plane that is parallel with and between the rollers of each pair. The depending members or strips 93 will then engage the said grapes and will cause them to roll end over end from the head ends of the rollers to the foot ends, the latter being at the discharge end of the machine.

As seen in Fig. 4 the members 95 yieldably engage the generally upwardly directed surfaces of the fruit so as to hold the fruit against the rollers and to positively prevent any piling up of the fruit on the rollers.

If any fruit should tend to roll on their sides down the rollers, with their stems projecting laterally of their direction of travel, the stems will engage the flexible teeth 74 and this will swing the fruit around so that the stems will be engaged between the rollers of each pair and will be pulled from the fruit. Also, the bridges 50, 51 that are along the lengths of the rollers will cause the fruit passing thereover to be readjusted on the rollers, so that any fruit not stemmed before it reaches the bridge 51, will be readjusted to increase its chance of being stemmed between bridges 50, 51 and if not stemmed before reaching bridge 50, the latter will effect another readjustment.

In actual practice the great majority of fruit is stemmed before reaching the first bridge 51, and most of the fruit not stemmed by the time bridge 51 is reached would actually be stemmed if the roller section between the head ends of the rollers and bridge 51 were longer. However, by the present structure, the machine operates very close to 100% efficiency, and the movement of the grapes along the rollers under the influence of the flexible members 95 is so rapid that a machine having say six pairs of rollers 36 inches in length, will stem on the average of 2500 lbs. of grapes per hour when the machine is operated at its normal speed.

From the description it is seen that there are no moisture absorbent parts. The bearings 21 to 24, 36 to 39 are preferably of lignum vitae and by the structure shown any wear on the rollers will be automatically compensated for. Also the rollers will automatically adjust themselves to any circumstance, since one roller of each pair is floatingly supported for movement in different planes. The intermeshing gears 66, 67 are so designed as to permit the movable roller of each pair to move toward and away from the other one without adversely effecting the driving connection between said gears.

I claim:

1. In a fruit stemming machine having a plurality of horizontally spaced pairs of rollers disposed in parallel, side by side relation in a common generally horizontally disposed plane for supporting fruit on the rollers of each pair for rolling of said fruit in single file longitudinally of said rollers; means connected with said rollers supporting said rollers for rotation and means operatively connected with said rollers for rotating the rollers of each pair for downward movement of their adjacent sides, a plurality of flexible, moisture proof strips in a row, said strips extending transversely across said pairs of rollers and said strips extending generally downwardly in direction transversely of their lengths, means connected with said strips along their upper edges supporting said strips along their upper edges with their lower edges free for upward yieldable movement of the portions of said strips along their free edges under the influence of fruit supported for movement on the rollers of each pair thereof, means connected with said strips at their ends for moving said strips longitudinally of said pairs of rollers for rolling said fruit along said pairs of rollers, adjacent strips of said row being slanted downwardly in direction away from the direction of movement of said strips over said rollers for positively rolling said fruit along said rollers and for yieldably urging said fruit downwardly against said rollers during said rolling, an elongated support of inverted V-shaped cross sectional contour extending longitudinally of said rollers and disposed between and above each adjacent pair of rollers for directing fruit onto the pair of rollers at either side of each of said supports, said strips being notched to receive said supports with portions of said strips disposed between said notches supports.

2. In a fruit stemming machine having a plurality of horizontally spaced pairs of rollers disposed in parallel, side by side relation in a common generally horizontally disposed plane for supporting fruit on the rollers of each pair for rolling of said fruit in single file longitudinally of said rollers; means connected with said rollers supporting said rollers for rotation and means operatively connected with said rollers for rotating the rollers of each pair for downward movement of their adjacent sides, a plurality of flexible, moisture proof strips in a row, said strips extending transversely across said pairs of rollers and said strips extending generally downwardly in direction transversely of their lengths, means connected with said strips along their upper edges supporting said strips along their upper edges with their lower edges free for upward yieldable movement of the portions of said strips along their free edges under the influence of fruit supported for movement on the rollers of each pair thereof, means connected with said strips at their ends for moving said strips longitudinally of said pairs of rollers for rolling said fruit along said pairs of rollers, adjacent strips of said row being slanted downwardly in direction away from the direction of movement of said strips over said rollers for positively rolling said fruit along said rollers and for yieldably urging said fruit downwardly against said rollers during said rolling, an elongated support of inverted V-shaped cross sectional contour extending longitudinally of said rollers and disposed between and above each adjacent pair of rollers for directing fruit onto the pair of rollers at either side of each of said supports, said strips being notched to receive said supports with portions of said strips disposed between said notches supports, said portions of said strips being formed with projections on their under sides for engaging said fruit on said pairs of rollers.

3. In a fruit stemming machine that includes a pair of parallel, generally horizontally extending rollers disposed in a generally horizontally disposed plane with the adjacent sides of said rollers in engaging relation, yieldable means associated with one of the rollers of said pair at the ends thereof for yieldably urging said rollers into said engaging relation, means connected with one of said rollers at one of its ends and means connecting the rollers of said pair at one of their corresponding ends for rotating said rollers for downward movement of their engaging sides, means above said rollers and directly over the line of engagement between them for rolling fruit supported on said rollers in direction longitudinally thereof comprising a row of flexible sheet members, said row extending longitudinally of said rollers with their flat sides extending transversely relative to the length of the row, means connected with said members supporting said members for movement in one direction in a path parallel with the axes of said rollers with said members slanted downwardly in the direction opposite to said movement whereby the lower edges of said members will trail their upper edges and whereby said members will yieldably urge said fruit downwardly against said rollers for causing said fruit to roll along the latter, said members being free from support below their upper edges for upward movement under the influence of fruit on said rollers engaged by said members, the trailing portion of one member of each adjacent pair being in lapping relation with the leading portion of an adjacent member of each such pair.

4. In a fruit stemming machine that includes a plurality of pairs of parallel, generally horizontally extending, horizontally spaced, rollers disposed in a generally horizontal plane and with the adjacent sides of the rollers of each pair in engaging relation for supporting fruit on the rollers of each pair for rolling thereon longitudinally of said rollers, upwardly yieldable means spaced above said pairs of rollers and movable longitudinally of said pairs for engaging fruit supported on said rollers for rolling on the latter, an inverted substantially V-shaped member extending longitudinally of said pairs of rollers and substantially across the space between adjacent pairs of rollers and projecting above the level of the latter, each V-shaped member including a flexible strip along the free longitudinally extending lower edge thereof adjacent to the upper surface of the adjacent rollers of each adjacent pair thereof, means for rotating the rollers of each pair in a direction for movement of their said upper sides toward each other and away from said strips, the edges of said strips adjacent to said upper sides of said rollers being indented to engage stems on fruit that may project laterally relative to the lengths of said rollers to tend to move said stems to alignment over the engaging sides of the rollers of each pair for gripping of said stems between said sides when said fruit is rolled longitudinally of said rollers.

5. In a fruit stemming machine that includes a pair of parallel, horizontally extending rollers in side by side yieldable engagement, for supporting fruit thereon in a single file extending longitudinally of said rollers, a row of resilient strips extending transversely across said pair of rollers and spaced from each other longitudinally of said rollers, said strips being correspondingly inclined relative to vertical, means connected with said strips supporting them in said row for movement thereof longitudinally of said row with their upper edges leading and with their lower trailing edges close to the rollers of said pairs for yieldably pressing fruit on said rollers against the latter and for positively rolling said fruit longitudinally of said rollers while said fruit is so pressed by said strips, means connected with said rollers for rotating them for downward movement of their adjacent sides, whereby stems on said fruit moved to said line of engagement will be gripped between said rollers and pulled from said fruit, stationary fruit confining means over said rollers and extending longitudinally of the latter for holding said fruit on said rollers and in said file, and means stationary against movement longitudinally of said rollers spaced longitudinally of said rollers and projecting from said confining means toward said rollers engageable by the stems that extend laterally over said rollers for swinging such stems rearwardly of said fruit and generally over said line of engagement as such fruit is rolled on said rollers longitudinally thereof.

6. In a fruit stemming machine, a pair of parallel, horizontally extending rollers in side by side engagement for supporting fruit thereon in a single file extending longitudinally of said rollers, means above said rollers for moving fruit therealong, stationary supports below the opposite ends of said rollers, a pair of spaced bearings at each of the opposite ends of said pair of rollers having lateral, oppesedly opening recesses therein through the open sides of which the ends of said rollers are adapted to be inserted and removed, and in which recesses said ends are rotatably supported, means securing the bearings at the ends of one roller stationary on said supports and the bearings at the ends of the other roller being slidable on said support toward the stationary bearings, springs engaging the bearings that are slidable on said support yieldably urging them toward the stationary bearings and for yieldably holding the ends of said rollers against the bottoms of the recesses in said stationary and slidable bearings, and for yieldably holding said rollers in engagement with each other to permit separation of said rollers upon stems being gripped between them, means connected with the roller that is supported in said stationary bearings for rotating said rollers for downward movement of their adjacent sides whereby stems on said fruit moved to said line of engagement will be gripped between said rollers and pulled from said fruit, the open sides of said bearings providing for lubrication of the ends of said rollers and for engagement of said rollers while said rollers are supported by said bearings and to permit the ends of the roller supported in said slidable bearings to alternately move toward and away from the ends of the roller in said stationary bearings free from binding in said slidable bearings.

7. In a fruit stemming machine, a pair of parallel horizontally extending rollers covered with a layer of rubber between their end portions and the latter being exposed for being supported in bearings, said pair of rollers being in side by side relation with said layers of rubber thereon in engagement for supporting fruit thereon in a single file extending longitudinally of said rollers, means above said rollers for moving fruit therealong, stationary supports below the exposed ends of said rollers, a pair of spaced bearings at each of the opposite ends of said pair of rollers having lateral, opposedly opening recesses therein within which said exposed ends of said rollers are rotatably supported at the open sides of said recesses, means securing the bearings at the ends of one roller of said pair stationary on said supports, and the bearings at the ends of the other roller being slidable on said support toward the stationary bearings and rockable on said support in the vertical plane in which said other roller is disposed to enable the exposed ends of said other roller to seat in the slidable and rockable bearings free from binding therein, springs engaging said slidably supported bearings yieldably urging them toward said stationary bearings and for yieldably holding the exposed ends of said rollers against the bottoms of the recesses in said bearings and for yieldably holding the rubber layers on said rollers in yieldable engagement with each other and to permit separation of said rollers upon stems or other solid objects passing between said rollers, means connected with the roller that is supported in said stationary bearings for rotating said rollers for downward movement of their adjacent sides whereby stems on said fruit moved to said line of engagement will be gripped between said rollers and pulled from said fruit, the open sides of said recesses enabling said rollers to be moved toward each other free from obstruction by material on said bearings intervening between the corresponding exposed ends of said rollers and also providing for lubrication of said exposed ends through the open sides of said recesses and permitting the ends of the roller in said slidable bearings to alternately move toward and away from the ends of the roller that are in said stationary bearings free from binding in said slidable bearings when stems or other solid material passing between one or the other ends of said rollers forces them apart.

References Cited in the file of this patent

UNITED STATES PATENTS

| | | |
|---|---|---|
| 1,414,889 | Navarre | May 2, 1922 |
| 1,478,426 | Dueker | Dec. 25, 1923 |
| 1,703,123 | Triplett | Feb. 26, 1929 |
| 1,835,190 | Stansbury | Dec. 8, 1931 |
| 1,880,482 | Raney et al. | Oct. 4, 1932 |
| 2,167,967 | Anderson et al. | Aug. 1, 1939 |
| 2,307,804 | Ryan | Jan. 12, 1943 |